United States Patent

[11] 3,589,466

[72] Inventor Walter E. Dudley
 377 Granville Road, North Granby, Conn. 06060
[21] Appl. No. 782,050
[22] Filed Dec. 9, 1968
[45] Patented June 29, 1971

[54] AUTOMOBILE SAFETY CONSTRUCTION FOR HEAD-ON COLLISION
 8 Claims, 6 Drawing Figs.
[52] U.S. Cl. .................................................. 180/82,
 180/64 L, 296/35 R, 293/48
[51] Int. Cl. ................................................ B60r 21/00
[50] Field of Search ........................................ 180/91-
 —97, 103, 82, 64, 1; 188/1; 293/52, 1, 48; 296/35, 65

[56] References Cited
 UNITED STATES PATENTS
| 3,525,413 | 8/1970 | Kripke et al. | 180/82 |
| 2,517,860 | 8/1950 | Forgy | 180/1 |
| 2,842,372 | 7/1958 | D'Antini | 180/91 X |
| 2,900,036 | 8/1959 | Blake | 180/82 |
| 3,162,479 | 12/1964 | Hewitt | 296/35 |
| 3,331,460 | 7/1967 | Bacon | 180/82 X |
| 3,357,736 | 12/1967 | McCarthy | 296/65 |
| 3,479,080 | 11/1969 | Hilfiker | 180/89 X |
| 2,220,272 | 11/1940 | Pitura et al. | 293/48 |

FOREIGN PATENTS
| 605,295 | 9/1960 | Canada | 296/35 |

Primary Examiner—Kenneth H. Betts
Attorney—Roberts, Cushman and Grover

ABSTRACT: An automobile having a passenger compartment mounted on the chassis to rotate about a horizontal axis which extends transversely of the automobile, the center of gravity of the compartment being below the axis so that, in a head-on collision, the inertia of the compartment tends to rotate the passengers forwardly and upwardly about the aforesaid axis, and means for mounting the engine so that, when torn loose, it is directed downwardly and rearwardly under the passenger compartment.

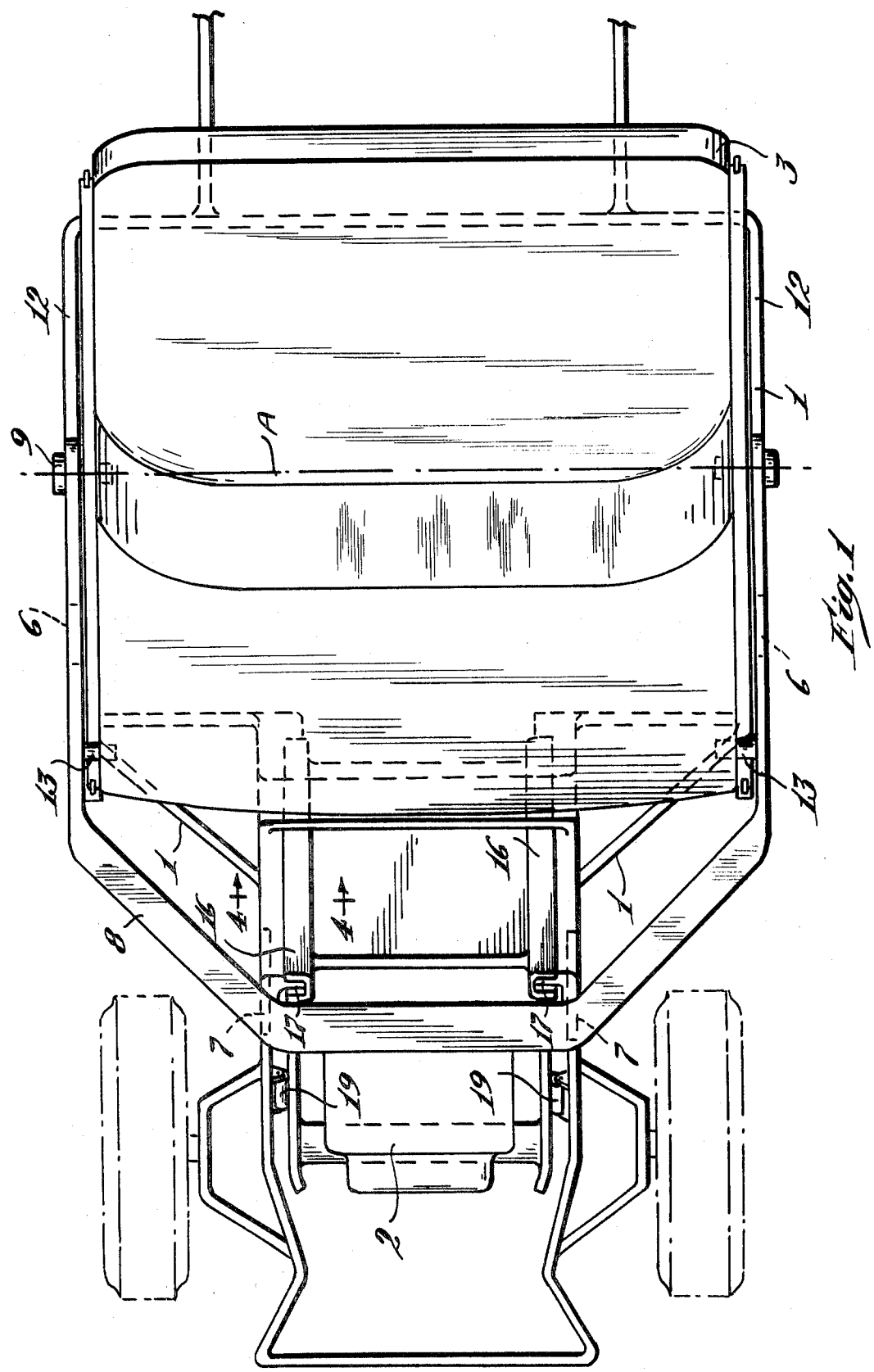

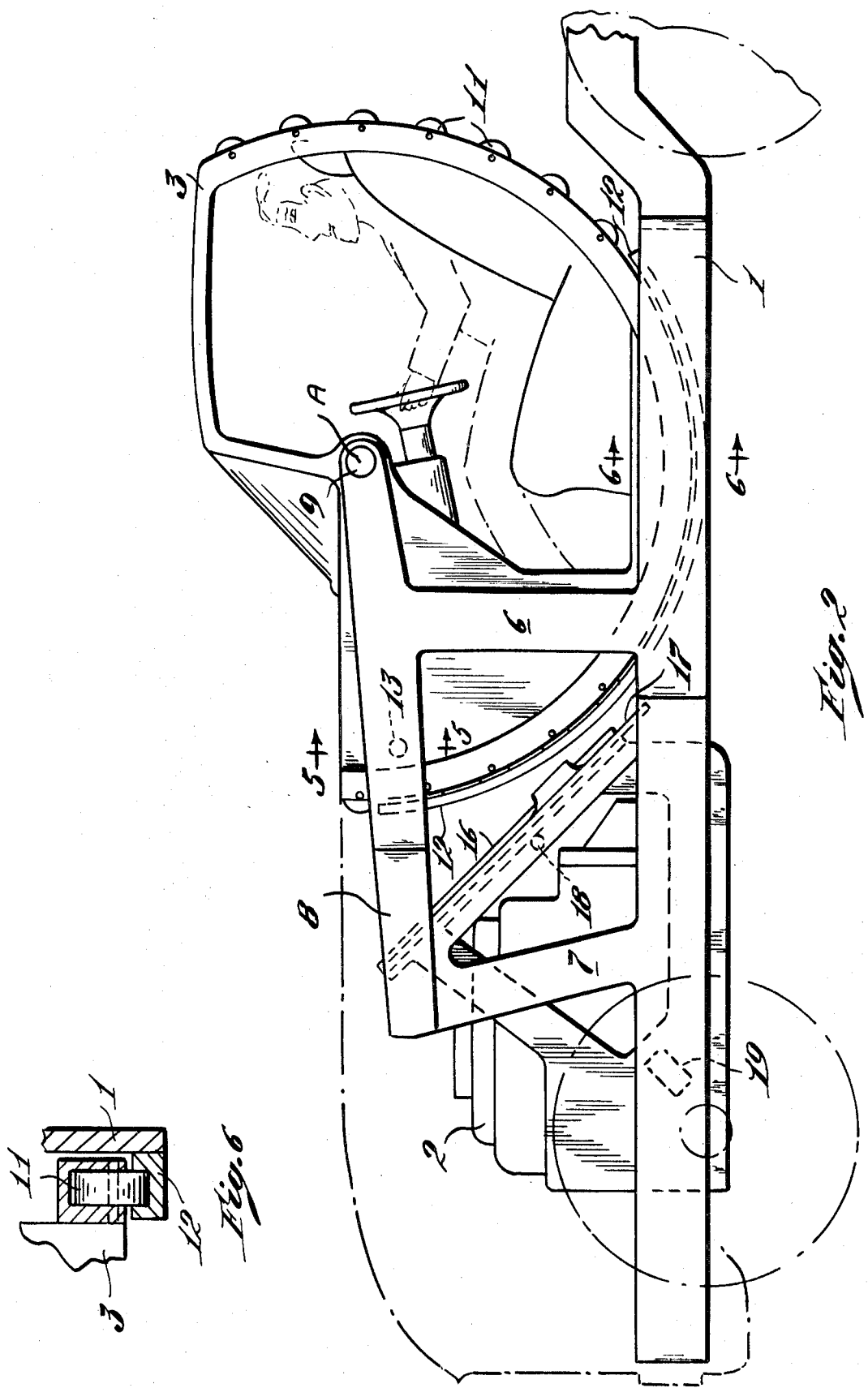

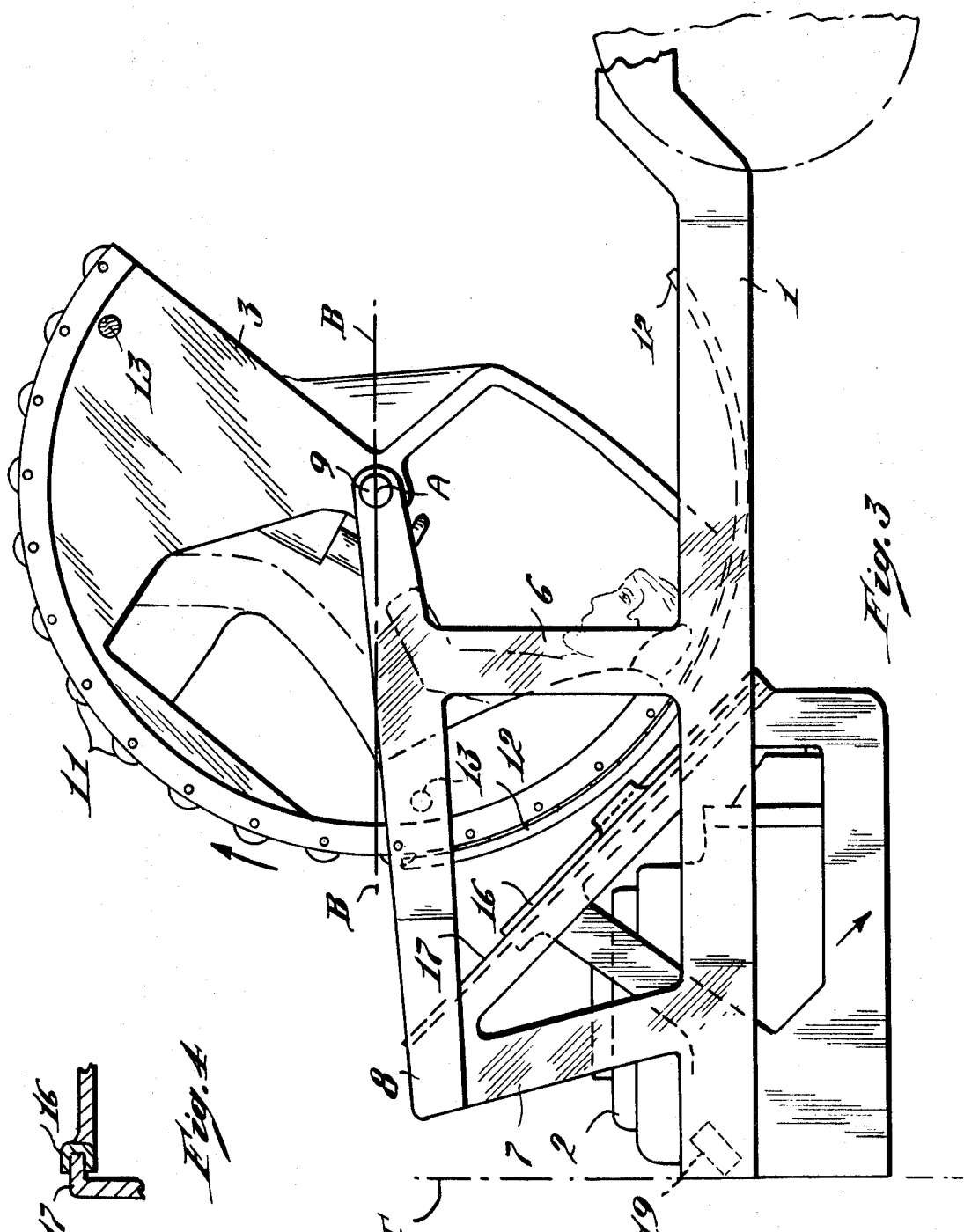
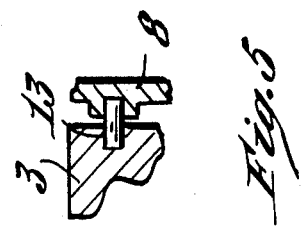

AUTOMOBILE SAFETY CONSTRUCTION FOR HEAD-ON COLLISION

Objects of the invention are to provide an automobile which, in case of a head-on collision, prevents the passengers from being thrown forwardly and prevents the engine from being telescoped into the passenger compartment.

According to this invention the automobile comprises a chassis, a passenger compartment, means to mount the compartment on the chassis to rotate about a horizontal axis which extends transversely of the automobile, the center of gravity of the compartment being disposed below said axis so that, in a head-on collision, either direct or oblique, the inertia of the compartment tends to rotate the passengers forwardly and upwardly about said axis, an engine in front of the passenger compartment, and means for mounting the engine on the chassis including means for guiding the engine downwardly under said compartment in a head-on collision which loosens the engine from the chassis. The aforesaid center of gravity is preferably disposed somewhat to the rear of the aforesaid axis so that the passenger compartment rotates somewhat more than 90° to the position shown in FIG. 3 where the momentum of the passengers is distributed equally over the seats and backs. Preferably the periphery of said compartment comprises a cylindrical portion approximately concentric with said axis, and the compartment is free to rotate approximately 90° so that the seats absorb the momentum of the passengers. The aforesaid mounting means may comprise any suitable means for guiding the rotary movement of the passenger compartment, such as pivots or antifriction bearings or both. The chassis may comprise supports for the pivots which extend forwardly to the front of the chassis to serve as bumpers. The engine is mounted on the chassis so that, in case of head-on collision, the passenger compartment rides over the engine instead of telescoping with the engine.

For the purpose of illustration a typical embodiment of the invention is shown in the accompanying drawings in which FIG. 1 is a plan view;

FIG. 2 is a side view with the passenger compartment in normal position;

FIG. 3 is a similar view with the passenger compartment rotated approximately 90° and the engine pushed back by collision with an abutment;

FIG. 4 is a section on line 4—4 of FIG. 1;

FIG. 5 is a section on line 5—5 of FIG. 2; and

FIG. 6 is a section on line 6—6 of FIG. 2.

The particular embodiment of the invention chosen for the purpose of illustration comprises the usual chassis 1 and engine 2. According to this invention the passenger compartment 3 is mounted on the chassis to rotate about a horizontal axis A extending transversely of the automobile so that, in the case of a head-on collision, the compartment rotates from the position shown in FIG. 2 to the position shown in FIG. 3 where the momentum of the passengers merely presses them against their seats. The compartment may have side doors or it may be open as shown in the drawings. If open it is preferably surrounded by a body of usual construction having side doors.

The chassis comprises two longitudinal side members each carrying uprights 6 and 7 interconnected at the top by a U-shaped bracket 8 on the ends of which the passenger compartment is mounted on pivots 9 to rotate about the aforesaid axis. To help support the passenger compartment it is provided with bearings 11 rolling in tracks 12 mounted on the chassis concentrically with the axis A. As shown in FIGS. 2 and 3 a portion of the compartment is cylindrical, the track is concentric with the cylindrical portion of the compartment, and the track contacts the compartment throughout its entire length in all positions of the compartment including the normal position shown in FIG. 2 and the extreme position shown in FIG. 3. The center of gravity of the passenger compartment is below the axis A so that a head-on collision tends to rotate it clockwise (FIGS. 2 and 3), and the center of gravity is adjacent the axis to minimize the rotational force so that the compartment will not move from the position shown in FIG. 2 to that shown in FIG. 3 with force enough to injure the passenger. In order uniformly to distribute the pressure of the passengers over their seats the passenger compartment should rotate to the position shown in FIG. 3 where the bisector B of the angle between the bottom and back of the seat is horizontal and the center of gravity should be on this bisector. Thus, in the normal position of the compartment, the center of gravity should be somewhat to the rear of the axis A.

To restrain the compartment from rotation except in response to heavy shock it is interconnected to the chassis by suitable means such as shear pins 13. The steering wheel and brake rods should also have suitable disconnect means (not shown) such as a pin-and-slot connection. Alternatively the connection may comprise a hydraulic system with servomechanism operatively connected to the control elements in the passenger compartment as disclosed for example in the French Pat. No. 705,020.

The engine frame has U-shaped channels 16 which slide on tracks 17 mounted on the chassis. To prevent the engine from sliding on the tracks disconnect means such as shear pins 18 are provided. In the case of a head-on collision these connections rupture and the drive shaft breaks or telescopes as usual. However instead of telescoping into the passenger compartment the engine is guided under the passenger compartment by the tracks 17. Rollers 19 may be mounted on the chassis to counteract side thrust in case of a collision which is oblique instead of straight on.

From the foregoing it will be understood that in the case of a head-on collision the passenger compartment rotates from the position shown in FIG. 2 to that shown in FIG. 3 so that, instead of being thrown through the windshield, the passengers are merely pressed against their seats, and the engine slides under the passenger compartment instead of being telescoped into the compartment. Also the bracket 8 serves as a secondary bumper to protect the passengers.

I claim:

1. An automobile comprising a chassis, a passenger compartment and means to mount the compartment on the chassis to rotate about a horizontal axis which extends transversely of the automobile, the center of gravity of the compartment being disposed below said axis so that, in a head-on collision, the inertia of the compartment tends to rotate the passengers forwardly and upwardly about said axis and the center of gravity being adjacent said axis to minimize the rotational force, wherein said axis is fixed and the periphery of said compartment comprises a cylindrical portion approximately concentric with the axis, and means to support the compartment, said means being located along a path concentric with said cylindrical portion and wholly supporting the compartment in all positions of the compartment.

2. An automobile according to claim 1 wherein the chassis comprises supporting means for said pivots which extend forwardly to serve as a bumper at approximately the level of said axis.

3. An automobile according to claim 2 wherein said bumper is above the level of the top of the engine.

4. An automobile according to claim 2 wherein said bumper does not extend forwardly as far as the chassis.

5. An automobile comprising a chassis, a passenger compartment, means to mount the compartment on the chassis to rotate about a horizontal axis which extends transversely of the automobile, the center of gravity of the compartment being disposed below said axis so that, in a head-on collision, the inertia of the compartment tends to rotate the passengers forwardly and upwardly about said axis, an engine in front of the passenger compartment, and means for mounting the engine on the chassis including means for guiding the engine downwardly and rearwardly under said compartment in a head-on collision which loosens the engine from the chassis.

6. An automobile according to claim 5 further characterized by a bumper which is above the level of the engine and which does not extend forwardly as far as the chassis.

7. An automobile comprising a chassis including two longitudinal side members, a passenger compartment, an engine in front of the passenger compartment, attaching means for detachably mounting the engine on said side members, track means on said side members and track engaging means on said engine for guiding the engine downwardly and rearwardly under said compartment in a head-on collision which loosens the engine from the chassis.

8. An automobile according to claim 7 further characterized by a bumper which is above the level of the engine and which does not extend forwardly as far as the chassis.